United States Patent
Meng et al.

(10) Patent No.: US 12,260,514 B2
(45) Date of Patent: *Mar. 25, 2025

(54) METHOD AND APPARATUS FOR IMAGE PROCESSING

(71) Applicant: GUANGDONG OPPO MOBILE TELECOMMUNICATIONS CORP., LTD., Guangdong (CN)

(72) Inventors: Zibo Meng, Palo Alto, CA (US); Runsheng Xu, Palo Alto, CA (US); Chiuman Ho, Palo Alto, CA (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/697,866

(22) Filed: Mar. 17, 2022

(65) Prior Publication Data
US 2022/0207651 A1    Jun. 30, 2022

Related U.S. Application Data

(63) Continuation of application No. PCT/CN2020/109580, filed on Aug. 17, 2020.
(Continued)

(51) Int. Cl.
G06T 3/4046 (2024.01)
G06N 3/045 (2023.01)
G06N 3/08 (2023.01)

(52) U.S. Cl.
CPC .......... G06T 3/4046 (2013.01); G06N 3/045 (2023.01); G06N 3/08 (2013.01)

(58) Field of Classification Search
CPC .......... G06T 2207/20084; G06T 2207/20081; G06T 5/60; G06T 5/70; G06T 5/73;
(Continued)

(56) References Cited

U.S. PATENT DOCUMENTS

| 2018/0293429 A1 | 10/2018 | Wechsler et al. |
| 2019/0130562 A1 | 5/2019 | Liu et al. |

FOREIGN PATENT DOCUMENTS

| CN | 108010031 | 5/2018 |
| CN | 108447036 | 8/2018 |

(Continued)

OTHER PUBLICATIONS

Cai, Yuantian, and U. Kintak. "Low-light image enhancement based on modified U-Net." 2019 International Conference on Wavelet Analysis and Pattern Recognition (ICWAPR). IEEE, Jul. 2019. (Year: 2019).*

(Continued)

*Primary Examiner* — Raphael Schwartz
(74) *Attorney, Agent, or Firm* — Hodgson Russ LLP (57) ABSTRACT

Provided are method and apparatus for image processing. A neural network includes an encoding network, an intermediate network, and a decoding network including multiple input layers and an output layer. In the method, at an input layer of the decoding network, first output data is received from a previous layer, and a first operation is performed on the first output data to obtain first input data of the input layer, the input layer is any one of multiple input layers. At the input layer, second output data is received from a corresponding layer of the encoding network, and a second operation is performed on the second output data to obtain second input data of the input layer. Output data of the input layer is obtained according to the first and second input data. Operations are performed in a next layer based on the output data to obtain an output image.

17 Claims, 6 Drawing Sheets

Related U.S. Application Data (60) Provisional application No. 62/909,541, filed on Oct. 2, 2019.

(58) Field of Classification Search
CPC ............ G06T 5/00; G06T 2207/20182; G06V 10/82; G06N 3/0455; G06N 3/0464; G06N 3/08; G06N 3/045; G06N 3/04
See application file for complete search history.

(56) References Cited

FOREIGN PATENT DOCUMENTS

| | | |
|---|---|---|
| CN | 108986050 | 12/2018 |
| CN | 109190752 | 1/2019 |
| CN | 109285112 | 1/2019 |
| CN | 109978936 | 7/2019 |
| CN | 110110751 | 8/2019 |
| EP | 3522079 | 8/2019 |
| WO | 2016132145 | 8/2016 |
| WO | 2018170393 | 12/2018 |

OTHER PUBLICATIONS

Ibtehaz, "MultiResUNet : Rethinking the U-Net Architecture for Multimodal Biomedical Image Segmentation", https://arxiv.org/pdf/1902.04049, Feb. 11, 2019 (Year: 2019).*
Ronneberger, Olaf, Philipp Fischer, and Thomas Brox. "U-net: Convolutional networks for biomedical image segmentation." Medical image computing and computer-assisted intervention—MICCAI 2015: 18th international conference, Munich, Germany, Oct. 5-9, 2015 (Year: 2015).*
USPTO, Non-final Rejection for U.S. Appl. No. 17/696,787, Jun. 14, 2024.
WIPO, International Search Report and Written Opinion for International Application No. PCT/CN2020/109581, Nov. 26, 2020.
Ronneberger et al. U-Net: Convolutional Networks for Biomedical Image Segmentation, arXiv:1505.0497v1, May 18, 2015.
WIPO, International Search Report and Written Opinion for International Application No. PCT/CN2020/127126, Jan. 29, 2021.
Rizwan et al., "Local enhancement for robust face detection in poor SNR images," International Journal of Computer Science and Network Security, Jun. 2009, vol. 9, No. 6.
Socolinsky et al., "Image intensification for low-light face recognition," Proceedings of the 2006 Conference on Computer Vision and Pattern Recognition Workshop (CVPRW06), 2006.
Ren et al., "A novel approach of low-light image used for face recognition," 2015 4th International Conference on Computer Science and Network Technology (ICCSNT), 2015., vol. 1.
Kang et al., "A novel approach of low-light image denoising for face recognition," Advances in Mechanical Engineering, 2014, No. 256790.
Cho et al., "Face Detection in Nighttime Images Using Visible-Light Camera Sensors with Two-Step Faster Region- Based Convolutional Neural Network," Sensors, 2018, vol. 18, No. 9.
Rudin et al., "Nonlinear total variation based noise removal algorithms," Physica D: Nonlinear Phenomena, 1992, vol. 60.
Portilla et al., "Image denoising using scale mixtures of Gaussians in the wavelet domain," IEEE Transactions on Image Processing, 2003, vol. 12, No. 11.
Mairal et al., "Non-local sparse models for image restoration," IEEE 12th International Conference on Computer Vision (ICCV), 2009.
Gu et al., "Weighted nuclear norm minimization with application to image denoising," IEEE Conference on Computer Vision and Pattern Recognition, 2014.
Dabov et al., "Image denoising by sparse 3D transform-domain collaborative filtering," IEEE Transactions on Image Processing, 2007, vol. 16, No. 8.
Jain et al., "Natural image denoising with convolutional networks," Advances in Neural Information Processing Systems 21 (NIPS), 2008.
Zhang et al., "Beyond a Gaussian denoiser: Residual learning of deep CNN for image denoising," IEEE Transactions on Image Processing, 2017.
Hasinoff et al., "Burst photography for high dynamic range and low-light imaging on mobile cameras," ACM Transactions on Graphics, 2016, vol. 35, No. 6.
Liu et al., "Fast burst images denoising," ACM Transactions on Graphics, 2014, vol. 33, No. 6.
Dong et al., "Fast efficient algorithm for enhancement of low lighting video," IEEE International Conference on Multimedia and Expo, 2011.
Malm et al., "Adaptive enhancement and noise reduction in very low light-level video," IEEE 11th International Conference on Computer Vision, 2007.
Łoza et al., "Automatic contrast enhancement of low-light images based on local statistics of wavelet coefficients,". Digital Signal Processing, 2013, vol. 23, No. 6.
Park et al., "Low-light image enhancement using variational optimization-based Retinex model," IEEE Transactions on Consumer Electronics, 2007, vol. 63, No. 2.
Guo et al., "LIME: Low-light image enhancement via illumination map estimation," IEEE Transactions on Image Processing, 2017, vol. 26, No. 2.
Chen et al., "Learning to See in the Dark," Conference on Computer Vision and Pattern Recognition, 2018.
Wang et al., "Multiscale structural similarity for image quality assessment," Proceedings of the 37th IEEE Asilomar Conference on Signals, Systems and Computers, 2003.
Mildenhall et al., "Burst denoising with kernel prediction networks". EEE/CVF Conference on Computer Vision and Pattern Recognition, 2018.
Ibtehaz et al., "MultiResUNet: Rethinking the U-Net Architecture for Multimodal Biomedical Image Segmentation," Neural Networks, Jan. 2020, vol. 121.
WIPO, International Search Report and Written Opinion for PCT/CN2020/109580, Nov. 20, 2020.

* cited by examiner

METHOD AND APPARATUS FOR IMAGE PROCESSING

CROSS-REFERENCE TO RELATED APPLICATION(S)

This application is a continuation of International Patent Application No. PCT/CN2020/109580, filed Aug. 17, 2020, which claims priority to U.S. Provisional Application No. 62/909,541, filed Oct. 2, 2019, the entire disclosures of which are incorporated herein by reference.

TECHNICAL FIELD

This application relates to image processing, and more particularly to a method and an apparatus for image processing.

BACKGROUND

Taking photos with good perceptual quality under low illumination conditions is extremely challenging due to the low signal-to-noise ratio (SNR). Extending the exposure time can acquire visually good images. However, it can easily introduce motion blur, and it is not always applicable in real life. After an image is taken in a low-light condition with a short exposure, it is visually unfriendly since it is dark, and the color and details are invisible to the customers. To make the low-light images with short exposure time visually plausible, extensive study has been conducted including denoising techniques which aim at removing the noises included in the image due to the low illumination condition, and enhancement techniques which are developed for improving the perceptual quality of digital images.

However, current denoising methods are generally proposed and evaluated on synthetic data and the images thus obtained are not ideal enough. Besides, the convolutional neural network (CNN) in which the denoising is performed is too large in size.

SUMMARY

According to a first aspect of the disclosure, a method for image processing is provided. The method is applicable to a neural network which includes an encoding network, an intermediate network, and a decoding network, where the decoding network includes a plurality of input layers and an output layer. The method includes the following. At an input layer of the decoding network, first output data is received from a previous layer, and a first operation is performed on the first output data to obtain first input data of the input layer, where the input layer is any one of the plurality of input layers. At the input layer, second output data is received from a corresponding layer of the encoding network, and a second operation is performed on the second output data to obtain second input data of the input layer. Output data of the input layer is obtained according to the first input data and the second input data. Operations are performed in a next layer based on the output data of the input layer to obtain a decoding output, and an output image is obtained according to the decoding output.

According to a second aspect of the disclosure, an apparatus for image processing is provided. The apparatus is based on a neural network, which includes an encoding network, an intermediate network, and a decoding network, where the decoding network includes multiple input layers and an output layer. The apparatus includes at least one processor and a memory coupled with the at least one processor. The memory is configured to store instructions which, when executed by the at least one processor, are operable with the processor to implement the neural network to: receive, at an input layer of the decoding network, first output data from a previous layer, and perform a first operation on the first output data to obtain first input data of the input layer, where the input layer is any one of the plurality of input layers; receive, at the input layer, second output data from a corresponding layer of the encoding network, and perform a second operation on the second output data to obtain second input data of the input layer; obtain output data of the input layer according to the first input data and the second input data; perform operations in a next layer based on the output data of the input layer to obtain a decoding output, and obtain an output image according to the decoding output.

According to a third aspect of the disclosure, a non-transitory computer readable storage medium is provided. The non-transitory computer readable storage medium is configured to store instructions which, when executed by a processor, are operable with the processor to implement a neural network. The neural network includes an encoding network, an intermediate network, and a decoding network. The decoding network includes a plurality of input layers and an output layer. The neural network is implemented to: receive, at an input layer of the decoding network, first output data from a previous layer, and perform a first operation on the first output data to obtain first input data of the input layer, where the input layer is any one of the plurality of input layers; receive, at the input layer, second output data from a corresponding layer of the encoding network, and perform a second operation on the second output data to obtain second input data of the input layer; obtain output data of the input layer according to the first input data and the second input data; perform operations in a next layer based on the output data of the input layer to obtain a decoding output, and obtain an output image according to the decoding output.

Features and details of the forging aspects and respective embodiments thereof can be combined or substituted with each other without conflicts.

BRIEF DESCRIPTION OF THE DRAWINGS

The disclosure can be better understood from the following detailed description when read in conjunction with the accompanying drawings. It is emphasized that, according to common practice, various features of the drawings are not to-scale. On the contrary, the dimensions of the various features are arbitrarily expanded or reduced for clarity. The same reference numerals are used throughout the drawings to reference like components or features.

DETAILED DESCRIPTION

For illustrative purpose, specific exemplary embodiments will now be explained in detail below in conjunction with the figures.

The embodiments for image processing set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

"Terminal" used herein can be an electronic device with communication ability. The electronic device can include various handheld devices, on-board devices, wearable devices, computing devices or other devices with wireless communication function, other processing devices connected to wireless modems, as well as various user equipment (UE), mobile stations (MS), terminal devices, and the like. The term "mobile device" used herein includes but is not limited to mobile phones, personal digital assistant (PDA), or other handheld communication equipment, intelligent digital cameras or other handheld image processing equipment.

Image denoising and enhancement for low-light images are highly desired on mobile devices, and have been extensively studied in the past decades which are discussed in the following sections. Low-light images refer to images which are taken under extreme low-lighting conditions, and thus have low contrast, low brightness, and high noise. The low lighting condition is not necessarily just night. Indoors photography without much ambient light (as in many of our homes) as well as the light that is barely visible to our eyes at night, are also considered to be low-lighting conditions. Examples of low-lighting conditions include but not limited to shadow areas in daylight, low light environments after sunset, as well as at night where only brightest objects can be seen (1) Image Denoising Image denoising is performed to remove noises caused by low level light exposure and preserve the details in images at the same time. Traditional practices for image denoising are often based on specific assumptions such as image smoothness, sparsity, low rank, or self-similarity.

Most recently, deep convolutional neural networks (CNN) based methods are developed for image denoising.

In addition, a set of approaches which use a burst of images taken at the same time to perform denoising have been proposed. Although it generally yields good performance, they are elaboratively and computationally expensive.

(2) Low-Light Image Enhancement

Low-light image enhancement is a highly demanded image processing technique, especially for consumer digital cameras and cameras on mobile phones. Low-light image enhancement is a process of improving the quality of a digitally stored image by manipulating the image with algorithms. Low-light image enhancement is challenging in that it needs to consider not only brightness recovery but also complex issues like color distortion and noise, which usually hide in the dark.

A number of techniques have been developed for image enhancement, such as histogram equalization, and gamma correction. Recently, more advanced approaches have been proposed to deal with the enhancement of low-light images. However, these approaches share a strong assumption where the input image has clean representation without any noise. Thus, a separate denoising step should be employed beforehand for low-light image enhancement when such approach is adopted.

Furthermore, although CNNs have advanced many computer vision applications, CNN networks are generally too large in size to be implemented on resource limited devices, such as mobile phones. By applying the proposed techniques, with a size-reduced CNN, an image can be enhanced, and noises can be exhaustively removed for better representation on mobile phones with fruitful details and vivid colors.

Figure 1:
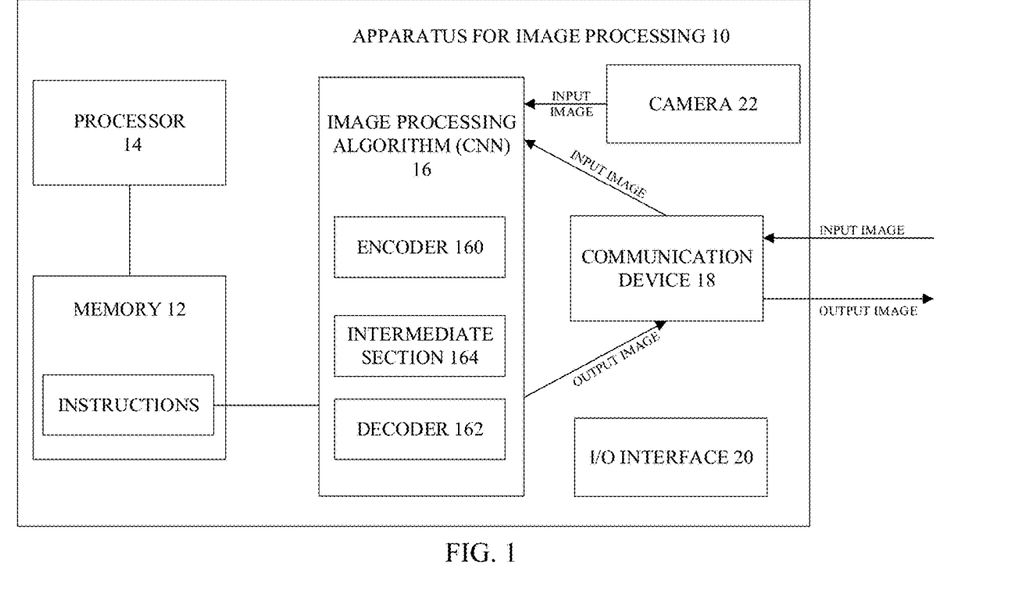
FIG. 1 illustrates an example apparatus in which embodiments of image processing can be implemented.

FIG. 1 illustrates an example apparatus in which embodiments of image processing can be implemented. As illustrated in FIG. 1, an apparatus 10 for image processing is provided. The apparatus 10 can be any type of computing device, client device, server, mobile phone, tablet, communication device, entertainment device, gaming device, media playback device, and/or other type of devices.

The apparatus 10 includes a memory 12 storing instructions which, when executed by a processor 14 or a processing system of the apparatus 10, are operable the apparatus 10, specifically, the processor 14, to implement image processing algorithm 16 (e.g., as a module, a component, a software application, a neural network, etc.) on the processor 14. The processor 14 can be a single core processor, a processing circuit of a single core processor, a multicore processor, or a core of a multicore processor. Examples of the processor include but not limited to an application processor, a graphics processor, and the like.

The neural network referred to herein can be a deep neural network (DNN), a recurrent neural network (RNN), a convolution neural network (CNN), or any other suitable neural networks. In the following, take CNN 16 as an example for illustrative purpose only. The CNN 16 receives an input image and conducts a series of operations on the input image received to obtain an output image, which can be comprehended as a denoised output image. The series operations include but not limited to upsampling or upscaling, convolution with different kernel size, downsampling or downscaling, concatenation, and the like. The input image has low contrast, low dynamic range, and is extremely noisy. The input image can be inputted to the apparatus through communication device 18 of the apparatus 10. Similarly, the output image can be outputted and/or presented to a user through the communication device 18. The communication device 18 enable wired and/or wireless communication of data such as images, videos, and/or graphic data generated by applications running on the apparatus for example.

In actual practice, the output image thus obtained can be used for face recognition. For example, it is common to used face recognition in mobile payment, mobile phone security control such as unlocking, and the like. With the output image obtained herein, the accuracy of face recognition can be improved.

The apparatus 10 also includes input/output (I/O) interface 20, such as data network interfaces that provide connection and/or communication links between apparatuses, devices, data networks, and the like. The I/O interfaces can be used to couple the device to any type of components, peripherals, and/or accessory devices, such as a digital camera device that may be integrated with device 502. The I/O interfaces also include data input ports via which any type of data, media content, and/or inputs can be received, for example, received from a user, as well as any type of audio, video, and/or image data received from any external content and/or data source, such as an external storage.

In at least one embodiment, the apparatus 10 may further include a camera 22, through which users can take pictures under low-light conditions. The pictures thus obtained can be used as the input image to be processed by the CNN 16. Alternatively, the input image can be obtained from an external storage via the I/O interfaces or extracted from an internal memory such as a local memory.

The input data and/or the output data can be presented to a user via a display which is not illustrated.

To implement image processing to obtain the denoised output image, an encoder-decoder network is employed to perform image denoising and enhancement to improve the perceptual quality of an image taken under extremely low-light condition, such as an image taken at night or taken in bad weather. In this regard, the CCN 16 can be structured to have an encoder 160 and a decoder 162. The CNN 16 can be also structured to have an intermediate section 164 between the encoder 160 and the decoder 162. The encoder 160 and the decoder 162 can interact with the intermediate section 164 as well as interact with each other. Each of the encoder 160, the decoder 162, and the intermediate section 164 can be structured to have multi-layers. For example, the decoder 162 includes multiple input layers and an output layer. The "layer" used herein refers to a neuron layer. The input layer is configured to input data and distribute the data received. The output layer is configured for output. The intermediate section, also known as intermediate layers, is responsible for receiving data from the encoder for calculation to obtain data to be provided to the decoder.

In the context, the terms "upscaling" and "upsampling" can be used interchangeably. Similarly, the terms "downscaling" and "downsampling" can be used interchangeably. The encoder or encoding network can be referred to as "upscaling stage" or "upsampling stage" and the decoder or decoding network can be referred to as "downscaling stage" or "downsampling stage".

In at least one embodiment, the memory 12 is configured to store instructions which, when executed by the at least one processor 14, are operable with the processor 14 to implement the neural network 16 to: receive, at an input layer of the decoder 162, first output data from a previous layer, and perform a first operation on the first output data to obtain first input data of the input layer, where the input layer is any one of the plurality of input layers; receive, at the input layer, second output data from a corresponding layer of the encoder 160, and perform a second operation on the second output data to obtain second input data of the input layer; obtain output data of the input layer according to the first input data and the second input data; perform operations in a next layer based on the output data of the input layer to obtain a decoding output, and obtain an output image according to the decoding output.

In at least one embodiment, the instructions being operable with the at least one processor 14 to implement the neural network 16 to perform the first operation on the first output data to obtain the first input data of the input layer are operable with the at least one processor 14 to implement the neural network 16 to: perform a 1×1 convolution on the first output data, and upsample the first output data convoluted to obtain the first input data.

In at least one embodiment, the corresponding layer is a layer having a same resolution as the input layer, and the second operation comprises a 1×1 convolution.

In at least one embodiment, the instructions being operable with the at least one processor 14 to implement the neural network 16 to obtain the output data of the input layer according to the first input data and the second input data are operable with the at least one processor 14 to implement the neural network 16 to: concatenate the first input data and the second input data to obtain a concatenated input data; perform at least one convolution on the concatenated input data to obtain the output data of the input layer.

In at least one embodiment, the at least one convolution is implemented as n successive 3×3 convolutions, where n is an integer and n≥1.

In at least one embodiment, the at least one convolution uses a convolution kernel having a same kernel size as that used in convolutions at the encoder 160.

In at least one embodiment, the instructions being operable with the at least one processor 14 to implement the neural network 16 to obtain the output image according to the decoding output are operable with the at least one processor 14 to implement the neural network 16 to: acquire an input image inputted at the encoder 160; perform point-to-point addition on the input image and the decoding output to obtain the output image.

In at least one embodiment, when the input layer is the last layer of the plurality of input layers, the next layer is the output layer of the decoder 162, and the operations performed in the next layer comprise a 1×1 convolution.

In at least one embodiment, when the input layer is the first layer of the plurality of input layers, the previous layer is the intermediate section, and the memory is further configured to store instructions which, when executed by the at least one processor, are operable with the at least one processor to implement the neural network to: at the intermediate section: receive, from the encoder, abstract features of an input image inputted at the encoding network; extract global information from the abstract features; upsample the global information to obtain sampled data; concatenate the global information and the sampled data and perform a 1×1 convolution on the abstract features and the sampled data concatenated to obtain the first output data. Global information or global feature of an image refers to the feature that can represent the whole image. The global feature is relative to the local feature of the image, and is used to describe the color, context, texture, and shape of the image or target. The abstract features refer to some abstract information and can be comprehended as some high-level local information of the image. High-level information is also referred to as advanced semantic information, and can be a piece of information synthesized through some information such as environmental information, texture information and so on.

In at least one embodiment, the memory 12 is further configured to store instructions which, when executed by the at least one processor 14, are operable with the at least one processor 14 to implement the neural network 16 to: perform a set of downsampling operations at the encoding network to obtain the abstract features.

Figure 2:
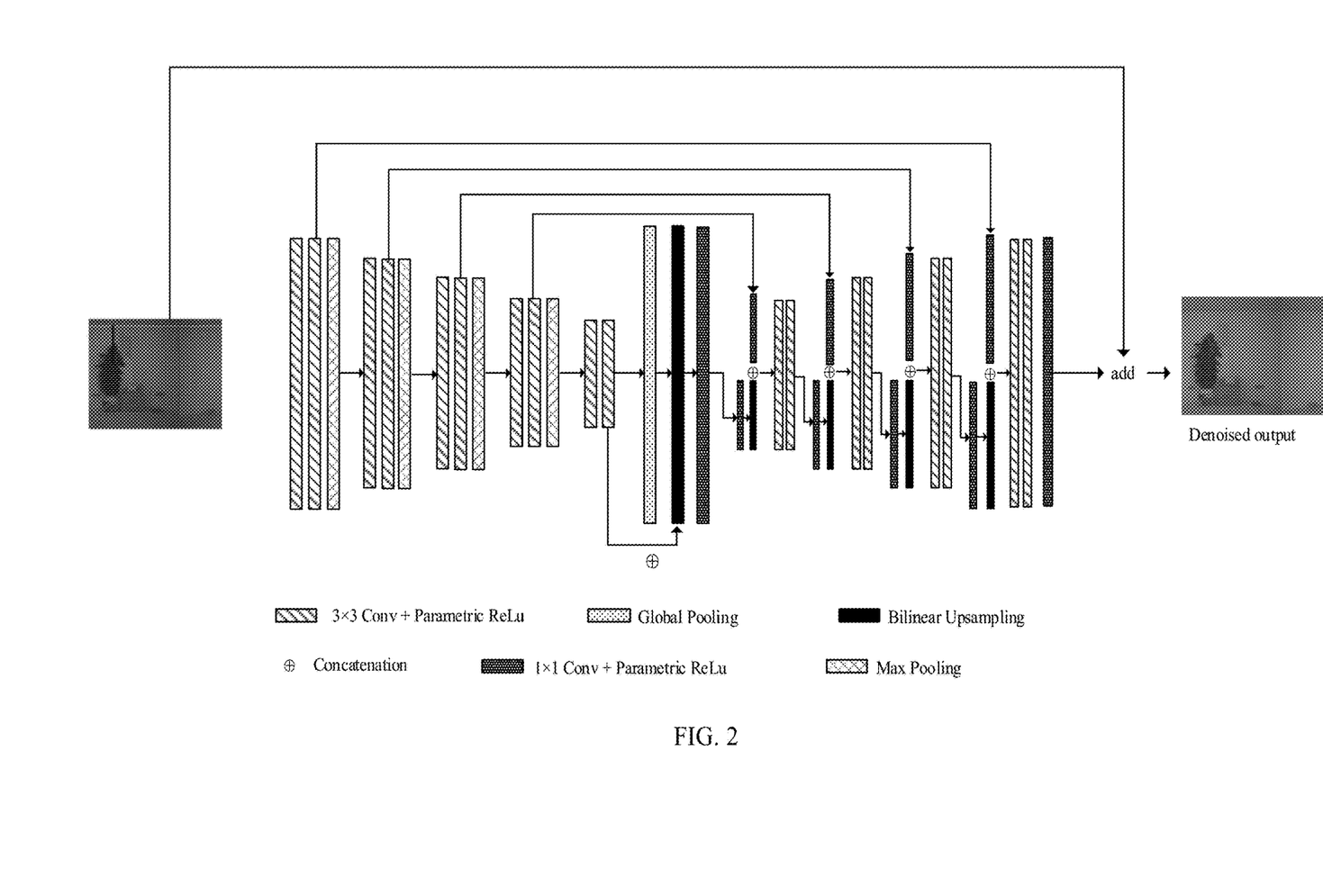
FIG. 2 illustrates pipeline of a framework of CNN for image processing.
Figure 3:
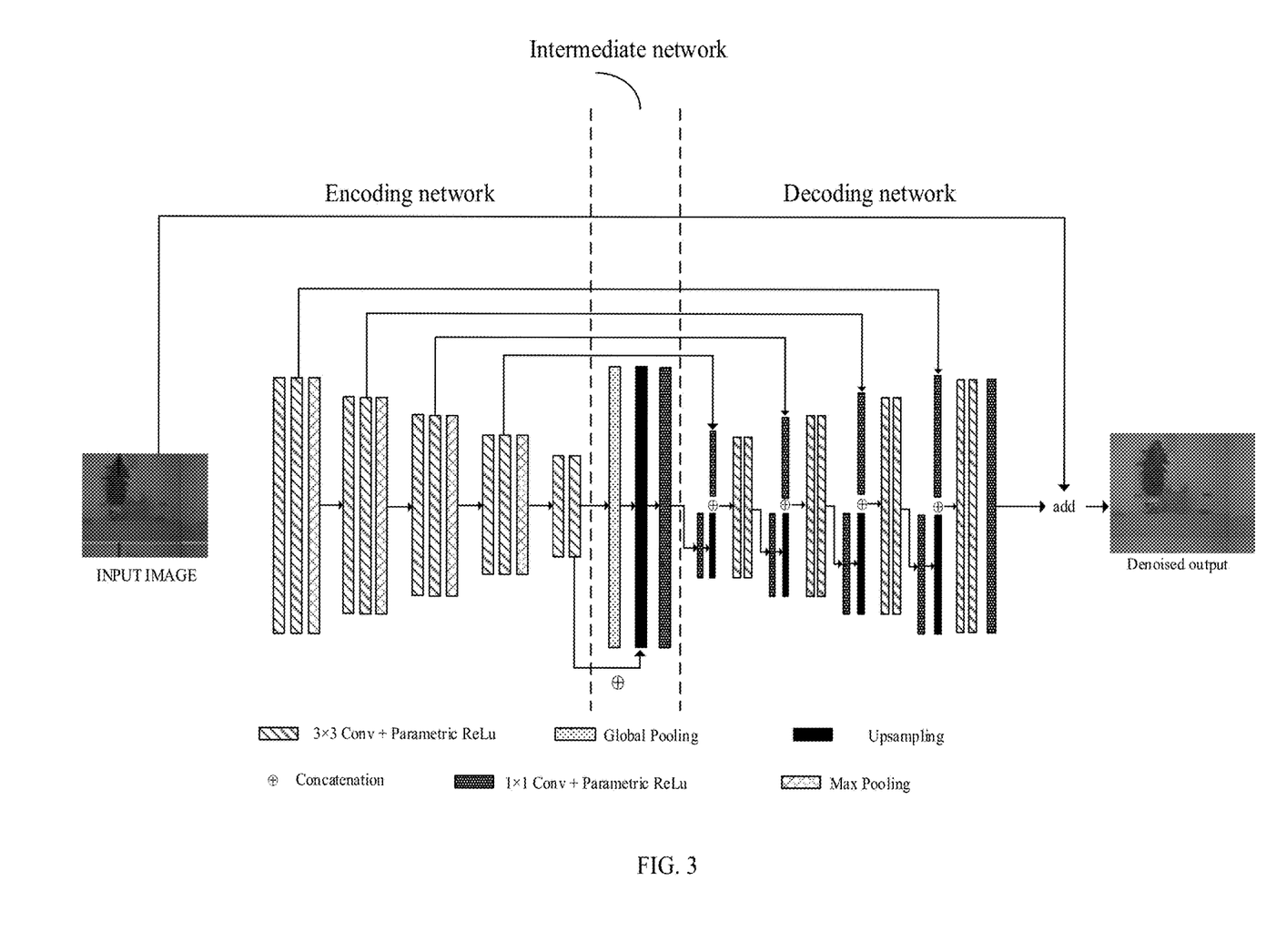
FIG. 3 illustrates layered structure of the CNN illustrated in FIG. 2.
Figure 4:
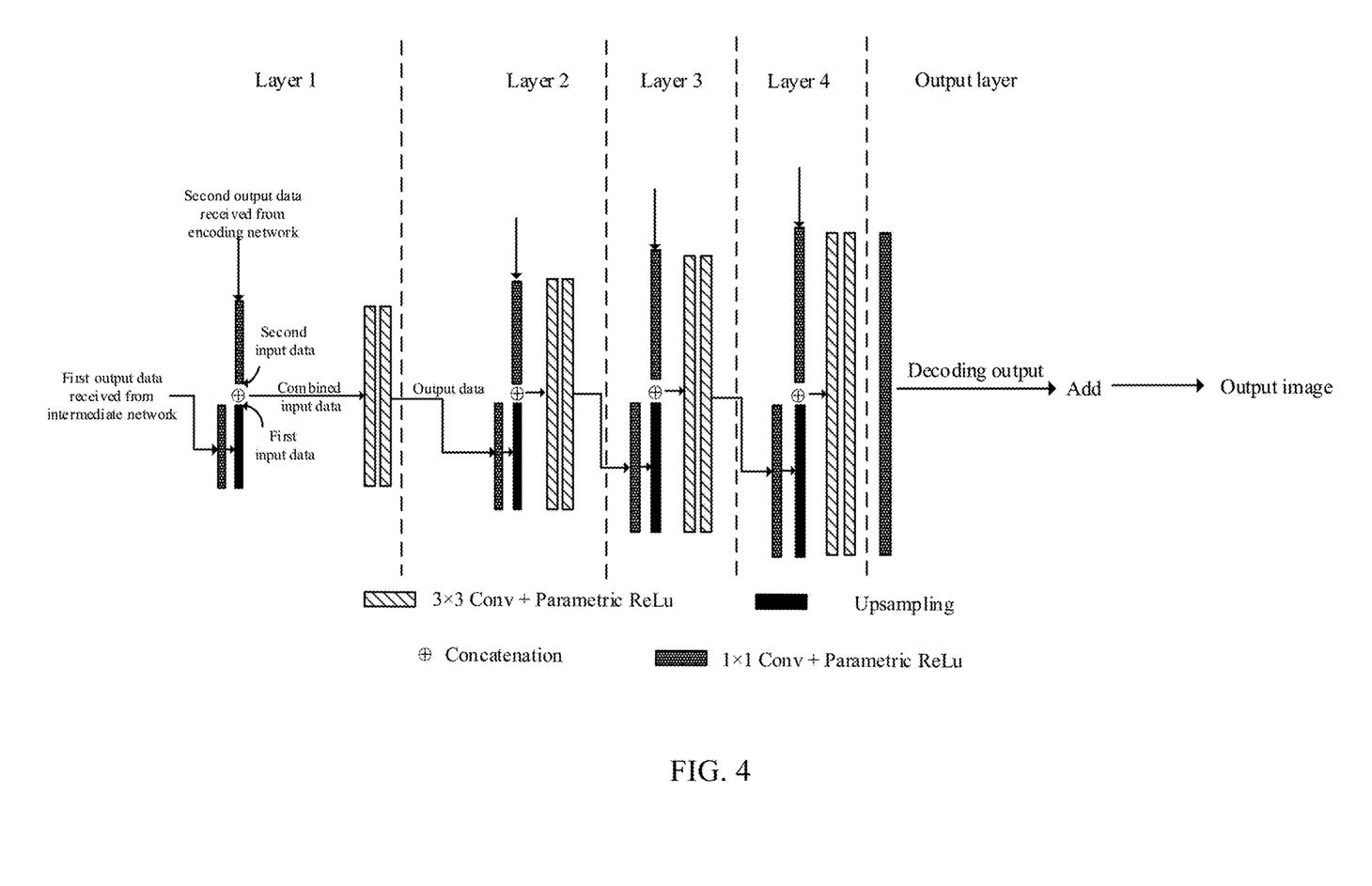
FIG. 4 illustrates the decoding network of the CNN of FIG. 3.

Architecture of the CNN 16 is further detailed in FIG. 2-FIG. 4. As will be described below, the encoder 160, decoder 162, and intermediate section 164 of FIG. 1 are embodied as an encoding network, a decoding network, and an intermediate network respectively in FIG. 3.

Network Architecture

FIG. 2 illustrates pipeline of a framework of an exemplary CNN. As illustrated in FIG. 2, the CNN can be implemented as an encoder-decoder network, also known as a U-net, which generally includes a contracting path and an expanding path. The U-net illustrated in FIG. 2 consists of a stack of processing layers. The input image firstly goes through an encoder (such as the encoder 160 of FIG. 1) including a set of downsampling stages to extract abstract features, as well as to reduce the spatial resolution. After the bottleneck, the feature map will go through a decoder (such as the decoder 162 of FIG. 1) composing of a set of upscaling operations. FIG. 3 illustrates the layered structure of the CNN illustrated in FIG. 2. In FIG. 3, for illustrative purpose only, the encoder 160 is illustrated as an encoding network, the intermediate section 164 is illustrated as an intermediate network, and the decoder 162 is illustrated as a decoding network. As further illustrated in FIG. 4, the decoding network includes multiple input layers and an output layer. For example, four input layers, that is, Layer 1, Layer 2, Layer 3, and Layer 4, are illustrated in FIG. 4. According to design requirements, more or less input layers can be used, which is not limited herein. It should be noted that, network division in FIG. 3 is logically rather than physically, and the terms "encoding network", "intermediate network", and the "decoding network" are introduced for the convenience of description rather than for any restriction. Still possibly, the first two layers from the left in the intermediate network can also be deemed as part of the encoding layer, leaving the rightmost layer of the intermediate network as a bottleneck.

The U-net illustrated in FIG. 2 or FIG. 3 is trained in an end-to-end fashion to generate a noise map of the input image taken under a low-light condition. Specifically, given an input image, I, the U-net illustrated is employed to learn a mapping, $\Delta I = f(I:w)$, to estimate the noise map of the input image, where $\Delta I$ is the estimated image (also known as predicted image), w is a set of learnable parameters of the network. The final denoised output is obtained by take the element wise summarization between the input image and the predicted noise map, i.e. $\hat{I} = I + \Delta I$.

Input Image Pre-Processing

Figure 5:
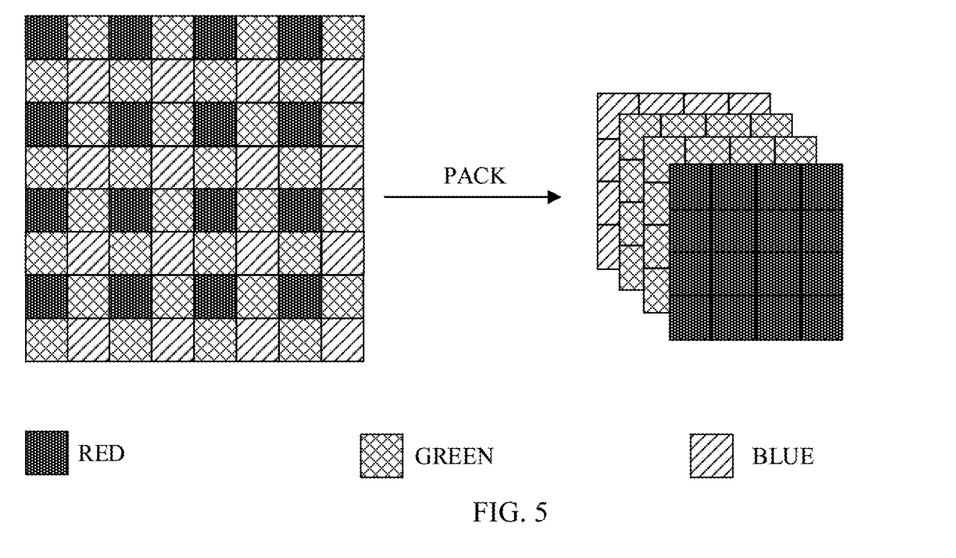
FIG. 5 illustrates packing of a Bayer array into four channels.

In one embodiment, the input raw image is Bayer arrays, which are packed into four channels which are corresponding to R, G1, G2, and B channels, respectively as illustrated in FIG. 5. Then the packed images subtract the black level and multiply with an amplification factor to match the brightness of the corresponding ground-truth images. Such pre-processing can be done outside the CNN separately, or can be done at the front end in the CNN before downscaling.

Image Processing

Figure 6:
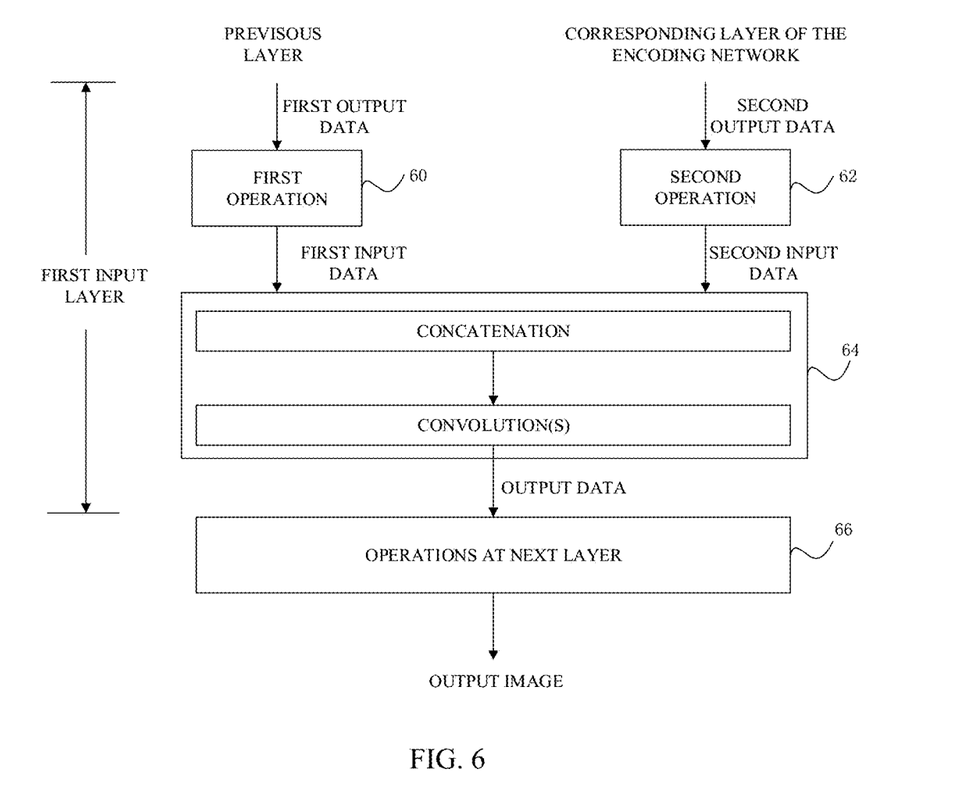
FIG. 6 is a flowchart illustrating a method for image processing according to an embodiment of the disclosure.

The method of image processing provided herein will now be described with reference to FIG. 6 and in conjunction with FIG. 3 and FIG. 4. FIG. 6 is a flowchart illustrating the method for image processing.

At an input layer of the decoding network, at block 60, first output data is received from a previous layer, and a first operation is performed on the first output data to obtain first input data of the input layer. At the input layer, at block 62, second output data is received from a corresponding layer of the encoding network, and a second operation is performed on the second output data to obtain second input data of the input layer. Output data of the input layer is obtained according to the first input data and the second input data at block 64. Operations are performed at a next layer at block 66 based on the output data of the input layer to obtain a decoding output, and an output image is obtained according to the decoding output.

There are no restrictions on the order of execution of the first operation at block 60 and the second operation at block 62. The first operation can be executed before or after the second operation, or the first operation and the second operation can be performed in parallel. The input data or the output data referred to herein can be a feature map(s).

Here, the input layer can be any one of the multiple input layers illustrated in FIG. 4. For simplicity of explanation, the method is explained assuming that the input layer currently under discussion is the first input layer of the decoding network, which is marked as Layer 1 illustrated in FIG. 4.

Local and Global Context Information

The input layer is Layer 1 of the decoding network illustrated in FIG. 4, accordingly, the previous layer is the intermediate network illustrated in FIG. 3. Since the input image can be of any resolution, the size of the feature maps in the bottleneck (the rightmost layer) of the intermediate network of FIG. 3 of the CNN can still be large, where the global information (such as color information) cannot be observed. As a result, the generated image may have inconsistent colors at different locations. To cope with the problem, global context/color information is introduced into the CNN through a pooling layer (the leftmost layer) of the intermediate network of FIG. 3.

Based on the architecture thus introduced, the first output data is obtained at the intermediate network as following. Abstract features of an input image inputted at the encoding network are received from the encoding network, and global information is then extracted from the abstract features, at the global pooling layer of FIG. 3. After the pooling layer, an upscaling operation is employed to rescale the feature map back to the same size of the input feature map to perform the following concatenation process, as well as the convolutional operations. Specifically, the global information is upsampled to obtain sampled data, at the upsampling layer of FIG. 3. The global information and the sampled data are concatenated and a 1×1 convolution is performed on the abstract features and the sampled data concatenated to obtain the first output data, at the 1×1 convolution layer of FIG. 3. At the 1×1 convolution layer, activation function such as parametric ReLU (Rectified Linear Unit) can also be applied. In terms of the abstract features, it is obtained through a set of downsampling operations at the encoding network.

The upsampling used herein can be bilinear upsampling, bicubic upsampling, or nearest neighbor upsampling, or other suitable upsampling or upscaling methods.

As such, low-light image denoising and enhancement will be performed in a single shot with the integration of the global context, this makes the network to be aware of the global context/color information to better generate the final output. Accordingly, the CNN framework provided herein is able to perform denoising and enhancement for low-light images with global context/color information integrated for raw images.

However, since the input of the framework of FIG. 2 and FIG. 3 has arbitrary size, which means that the feature map in the bottleneck has arbitrary size, the size of the kernel in deconvolutional layer will be dynamic, which is impeccable. Thus, instead of using a deconvolutional layer, an upscaling operation is employed in the decoding network. The extracted feature maps are concatenated channel-wisely followed by a 1×1 convolutional to generate the final representation containing global information of the input image.

Computational Cost Reduction

To reduce both the memory and time cost, in the upscaling stage of the decoding network, an input layer is firstly processed using a 1×1 convolutional layer to shrink the number of channels and then upscaled using bilinear interpolation. The layer of the same resolution from the downsampling stage of the encoding network is also processed using a 1×1 convolutional layer for channel shrinking purpose. Then the two output feature maps are concatenated as the input to the following layers. Details will be given below with reference to FIG. 3, FIG. 4, and FIG. 6.

Operations at the decoding network side are given below in more detail in reference to FIG. 4.

First Operation at Block 60

The input layer currently under discussion is Layer 1 of FIG. 4, and the first operation in the CNN at block 60 is illustrated in the lower left corner of FIG. 4. As illustrated in FIG. 4, the first output data, which is obtained as described in the above section, is received from intermediate network. The first output data thus received will be subject to a convolution layer and an upsampling layer. The first operation can be implemented as a convolution and upsampling accordingly. Specifically, a 1×1 convolution is performed on the first output data, and the first output data convoluted is then upsampled to obtain the first input data.

Second Operation at Block 62

The input layer currently under discussion is the Layer 1, and the second operation in the CNN at block 62 is illustrated in the upper left corner of FIG. 4. As illustrated in FIG. 4, the second output data is received from the encoding network. To be more specific, the second output data is received from a corresponding layer of the encoding network. The corresponding layer is a layer having a same resolution as the input layer. Such correspondence can be better understood from FIG. 2 or FIG. 3. As illustrated in the top half of the U-net structure of FIG. 2, as indicated by the arrow, the second output data is flowed into an input layer of the decoding network from a layer of the encoding network. As further illustrated in FIG. 4, the second output data received is provided to a convolution layer, accordingly, a 1×1 convolution is performed on the second output data to obtain the second input data of the input layer. The second output data can be feature maps obtained at the encoding network through convolutions. For example, as can be seen from FIG. 3, the convolution can be implemented as two successive 3×3 convolutions. Alternatively, convolutions with other kernel size other than 3×3 or other different number of convolutions can also be used.

Operations at Block 64

Based on the first input data obtained at block 60 and the second input data obtained at block 62, output data of the first input layer (for example, Layer 1) can be obtained. In at least one embodiment, for example, the first input data and the second input data are combined such as concatenated to obtain concatenated or combined input data, then a third operation on the concatenated input data to obtain the output data of the input layer. The third operation here can be embodied as at least one convolution. As illustrated in FIG. 4, the first input data and the second input data are subject to concatenation and then subject to at least one convolution.

In at least one embodiment, the at least one convolution is implemented as n successive 3×3 convolutions, where n is an integer and n≥1. In FIG. 4, n=2, and two successive 3×3 convolutions (3×3 Conv+Parametric ReLU) are illustrated. "ReLU" refers to a rectified linear unit, which is an activation function commonly used in artificial neural networks.

In at least one embodiment, the at least one convolution uses a convolution kernel having a same kernel size as that used in convolutions at the encoding network. For example, the kernel size can be 3×3, as discussed before.

Operations at Block 66

Once the output data of Layer 1 is obtained, the output data will be provided to the next layer for further processing. The next layer for Layer 1 is Layer 2, the next layer for Layer 2 is Layer 3, and so on. As illustrated in FIG. 4, in one branch, the output data of Layer 1 is provided to Layer 2 and operations at block 60 are performed on the output data of the Layer 1. Still at Layer 2, in another branch, output data from a corresponding layer of the encoding network is received and operations at block 62 are performed on the output data of the encoding network, then data from these two branches will be subject to concatenation and convolution (as described with reference to block 64) to be provided to Layer 3. Similar processing is also performed at Layer 3 and Layer 4, until the procedure reaches the output layer of FIG. 4, in which a decoding output is obtained. Based on the decoding output, an output image can be finally obtained.

When the input layer is the last layer of multiple input layers, the next layer is the output layer of the decoding network illustrated in FIG. 4. When the procedure reaches the output layer of FIG. 4, the input layer in this situation can be deemed as the last layer of the multiple input layers of the decoding network, that is, Layer 4. Here, in the output layer, a 1×1 convolution is performed on the output data of the input layer (Layer 4) to obtain the decoding output of the decoding network. The decoding output thus obtained is a noise map. With the 1×1 convolution, the number of channels of the feature map received at this output layer can be reduced to four, which corresponds to the four channels of the input image inputted into the encoding network respectively. "Feature map" is a function which maps a data vector to feature space, from another perspective, a feature map is the output activations for a given filter.

In at least one embodiment, in the output layer, based on the decoding output, an addition operation is further performed to obtain the output image (can be referred to as "denoised image"). Specifically, the addition operation is performed on the decoding output image and the input image inputted at the encoding network. Since the decoding output is a noise map rather than a clear image, by adding the decoding output with the input image, a denoised clear image can be obtained finally. For example, the input image inputted at the encoding network is acquired, and point-to-point addition is performed on the input image and the decoding output to obtain the output image.

The output image thus obtained can be subsequently used for facial recognition in various applications.

For example, the output image thus obtained can be provided to a facial recognition system of a terminal such as a mobile phone, a sign-in system, a data acquisition system, and other suitable systems for facial recognition or facial data collection. For instance, facial recognition is useful in identity authentication, mobile phone unlocking, payment, and other purposes. In case of facial recognition of a mobile phone, in some embodiments, the input image inputted into the encoding network can be obtained through a front facing camera of the mobile phone, such as camera 22 of FIG. 1. The output image obtained through the encoder-decoder network is provided to a controller coupled with the camera. The controller compares the output image received with a pre-stored facial image template. Specifically, the controller compares features of the output image received with features of the pre-stored facial image template. Facial recognition is successful when the output image matches the facial image template, for example, when the number of features matched exceeds a preset threshold.

Cost Function

During the training process, the low-light images are fed into the network as input, and a loss function is calculated between the system output and the corresponding long-exposure raw images. The loss function employed is a weighted joint loss of $\ell_2$ distance on pixel values and $\ell_1$ distance on pixel gradients, which is defined as follows:

$$\mathcal{L} = \lambda_1 \mathcal{L}^{\ell_1} + \lambda_2 \mathcal{L}^{\ell_2}$$

where $\lambda_1$ and $\lambda_2$ are both set to 1 empirically; $\mathcal{L}^{\ell_1}$ is the $\ell_1$ loss defined by the following equation:

$$\mathcal{L}^{\ell_1} = \|\nabla \Gamma(I(i)) - \nabla \Gamma(\hat{I}(i))\|_1$$

where $\hat{I}$ and $I$ are the output demosaicked image and the ground-truth demosaicked image, respectively; $\nabla$ is the finite difference operator that convolves its input with $[-1,1]$ and $[-1,1]^T$. $\Gamma$ is the sRGB (standard Red Green Blue) transfer function:

$$\Gamma = \begin{cases} 12.92X, & X \leq 0.0031308 \\ (1+a)X^{\frac{1}{2.4}}, & X > 0.0031308 \end{cases}$$

$$a = 0.0055$$

The $\ell_2$ loss is defined by the following equation:

$$\mathcal{L}^{\ell_2} = \|\Gamma(I(i)) - \Gamma(\hat{I}(i))\|_2^2$$

Inference

Figure 7:
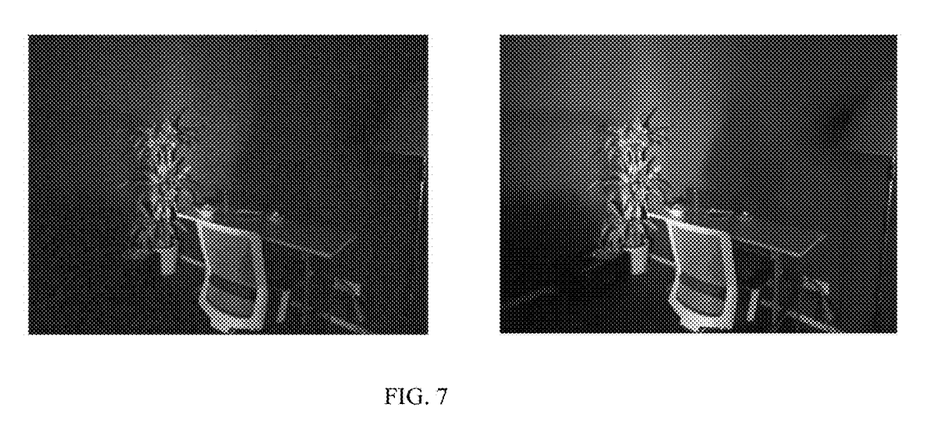
FIG. 7 illustrates an input image and an output image obtained through the CNN framework provided herein.

FIG. 7 illustrates an input low-light raw image in sRGB color space and an output image in sRGB color space outputted through the proposed framework of FIG. 2-FIG. 5. The output image in sRGB color space can be obtained through the method of FIG. 6. During the inference process, given an input raw image (illustrated on the left side of FIG. 7), the output raw image (illustrated on the right side of FIG. 7) will be obtained by summarizing the output of the well-trained network and the input raw image. Some qualitative results are given in FIG. 7.

Implementation Details on Mobile Phones

Figure 8:
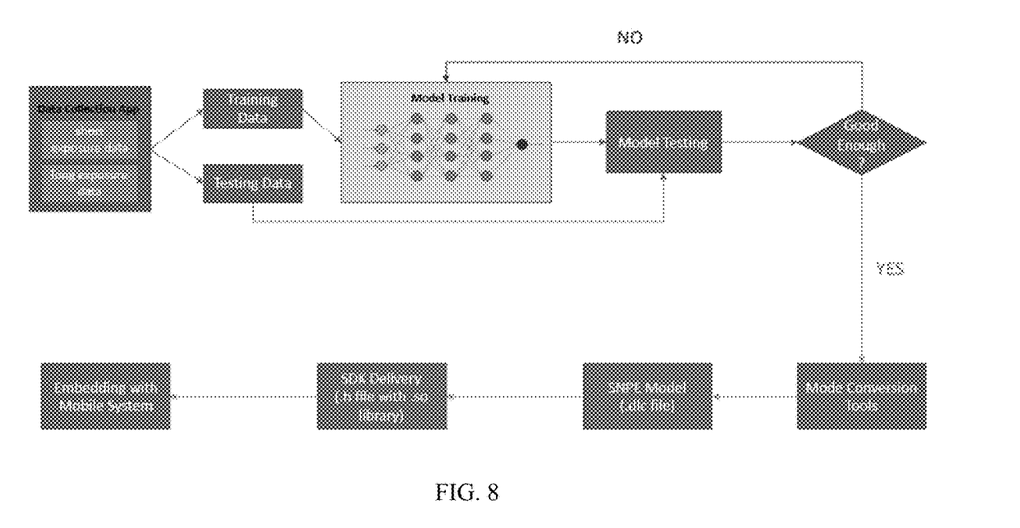
FIG. 8 illustrates the pipeline of a snapdragon neural processing engine (SNPE).

In this work, snapdragon neural processing engine (SNPE) is employed as the mobile inference framework. SNPE SDK offers a bunch of CNN building components enabling most of the popular deep neural networks to run on Qualcomm devices with optimized performance on both GPU and DSP. FIG. 8 illustrates the whole pipeline of the proposed system. As illustrated in FIG. 8, a data collection App is employed to acquire data, the data includes short exposure data and long exposure data, which will be used as training data and testing data in subsequent stages. The training data is provided for model training, and the testing data will be used for model testing on the trained mode. Model training can be carried out many times, until a good enough model is obtained. The good enough model thus obtained will be converted into a SNPE model to be delivered and then embedded with a mobile system. Mobile phones can be structured such that the model can be running thereon, for example, one mobile phone can be structured to have the components and functions described above with reference to FIG. 1.

Data Collection

A dataset is constructed for both training and testing purposes. Specifically, an app is developed to collect raw images with controlled ISO and shutter speed under low-light conditions. The app can be run on the apparatus for image processing given in FIG. 1. Each capture will return an image with short exposure time and an image with long exposure time, which will be used as the input image to the CNN illustrated in FIG. 2-FIG. 4 and the ground truth, respectively.

Deep Learning Container (DLC) Construction

After the model is trained and validated using Tensor flow, SNPE SDK is applied to convert the model into a DLC file which can run on Qualcomm devices.

Implementation on Mobile Devices

Android NDK is employed to combine the necessary data pre-processing and post-processing along with the DLC file to generate the SDK which contains a header file and a share object library. In the final stage, the SDK will be embedded into the mobile camera system so that the users can switch to an APP or algorithm which embodies the CNN provided herein when they take photos under low-light conditions.

Table 1 gives the performance of the proposed image enhancement network on different Qualcomm mobile, which demonstrates that the CNN framework or algorithm is ready to be delivered to mobile phones.

TABLE 1

Model performance across different mobile platforms

| Platform | Memory/MB | Speed/ms |
| --- | --- | --- |
| Qualcomm 855 | 680 | 510 |
| Qualcomm 845 | 680 | 810 |
| Qualcomm 710 | 680 | 1400 |

It will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

One of ordinary skill in the art can understand that all or part of the process for implementing the above embodiments can be completed by a computer program to instruct related hardware, and the program can be stored in a non-transitory computer readable storage medium. In this regard, according to embodiments of the disclosure, a non-transitory computer readable storage medium is provided. The non-transitory computer readable storage medium is configured to store at least one computer readable program or instruction which, when executed by a computer, cause the computer to carry out all or part of the operations of the method for image processing.

Particularly, when executed by the computer, the instructions stored in the memory are operable with the computer to implement the CNN framework illustrated in any of FIG.

2-FIG. 4 to process an input image obtained in low illumination conditions to obtain a denoised output image. For example, the CNN is implemented to: receive, at an input layer of the decoding network, first output data from a previous layer, and perform a first operation on the first output data to obtain first input data of the input layer, where the input layer is any one of the plurality of input layers; receive, at the input layer, second output data from a corresponding layer of the encoding network, and perform a second operation on the second output data to obtain second input data of the input layer; obtain output data of the input layer according to the first input data and the second input data; perform operations in a next layer based on the output data of the input layer to obtain a decoding output, and obtain an output image according to the decoding output. Such operations can make reference to FIG. 6 and details thereof will not be repeated to avoid redundancy.

Examples of the non-transitory computer readable storage medium include but are not limited to read only memory (ROM), random storage memory (RAM), disk or optical disk, and the like.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for image processing applicable to a neural network comprising an encoding network, an intermediate network, and a decoding network, the decoding network comprising a plurality of input layers and an output layer, the method comprising:
   receiving, at an input layer of the decoding network, first output data from a previous layer, and performing a first operation on the first output data to obtain first input data of the input layer, wherein the input layer is any one of the plurality of input layers;
   receiving, at the input layer, second output data from a corresponding layer of the encoding network, and performing a second operation on the second output data to obtain second input data of the input layer;
   obtaining output data of the input layer according to the first input data and the second input data; and
   performing operations in a next layer based on the output data of the input layer to obtain a decoding output, and obtaining an output image according to the decoding output;
   wherein when the input layer is the first layer of the plurality of input layers, the previous layer is the intermediate network;
   wherein the first output data is obtained at the intermediate network by:
      receiving, from the encoding network, abstract features of an input image inputted at the encoding network;
      extracting global information from the abstract features;
      upsampling the global information to obtain sampled data; and
      concatenating the abstract features and the sampled data and performing a 1×1 convolution on the abstract features and the sampled data concatenated to obtain the first output data.

2. The method of claim 1, wherein performing the first operation on the first output data to obtain the first input data of the input layer comprises:
   performing a 1×1 convolution on the first output data; and
   upsampling the first output data convoluted to obtain the first input data.

3. The method of claim 1, wherein the corresponding layer is a layer having a same resolution as the input layer, and performing the second operation on the second output data to obtain the second input data of the input layer comprises:
   performing a 1×1 convolution on the second output data to obtain the second input data of the input layer.

4. The method of claim 1, wherein obtaining the output data of the input layer according to the first input data and the second input data comprises:
   concatenating the first input data and the second input data to obtain a concatenated input data; and
   performing a third operation on the concatenated input data to obtain the output data of the input layer.

5. The method of claim 4, wherein performing the third operation on the concatenated input data to obtain the output data of the input layer comprises:
   performing at least one convolution on the concatenated input data to obtain the output data of the input layer.

6. The method of claim 5, wherein the at least one convolution is implemented as n successive 3×3 convolutions, wherein n is an integer and n≥1.

7. The method of claim 5, wherein the at least one convolution uses a convolution kernel having a same kernel size as that used in convolutions at the encoding network.

8. The method of claim 1, wherein when the input layer is the last layer of the plurality of input layers, the next layer is the output layer of the decoding network, and performing operations in the next layer based on the output data of the input layer to obtain the decoding output comprises:
   performing, in the output layer, a 1×1 convolution on the output data of the input layer to obtain the decoding output.

9. The method of claim 1, wherein obtaining the output image according to the decoding output comprises:
   acquiring an input image inputted at the encoding network; and
   performing point-to-point addition on the input image and the decoding output to obtain the output image.

10. The method of claim 1, wherein the abstract features are obtained through a set of downsampling operations at the encoding network.

11. A neural network based apparatus for image processing, the neural network comprising an encoding network, an intermediate network, and a decoding network, the decoding network comprising a plurality of input layers and an output layer, the apparatus comprising:
    at least one processor;
    a memory coupled with the at least one processor and configured to store instructions which, when executed by the at least one processor, are operable with the processor to implement the neural network to:
       receive, at an input layer of the decoding network, first output data from a previous layer, and perform a first operation on the first output data to obtain first input data of the input layer, wherein the input layer is any one of the plurality of input layers;
       receive, at the input layer, second output data from a corresponding layer of the encoding network, and perform a second operation on the second output data to obtain second input data of the input layer;

obtain output data of the input layer according to the first input data and the second input data; and perform operations in a next layer based on the output data of the input layer to obtain a decoding output, and obtain an output image according to the decoding output;

wherein when the input layer is the first layer of the plurality of input layers, the previous layer is the intermediate network, and the memory is further configured to store instructions which, when executed by the at least one processor, are operable with the at least one processor to implement the neural network to:

at the intermediate network:

receive, from the encoding network, abstract features of an input image inputted at the encoding network;

extract global information from the abstract features;

upsample the global information to obtain sampled data; and concatenate the abstract features and the sampled data and perform a 1×1 convolution on the abstract features and the sampled data concatenated to obtain the first output data.

12. The apparatus of claim 11, wherein the instructions being operable with the at least one processor to implement the neural network to perform the first operation on the first output data to obtain the first input data of the input layer are operable with the at least one processor to implement the neural network to:

perform a 1×1 convolution on the first output data; and upsample the first output data convoluted to obtain the first input data.

13. The apparatus of claim 11, wherein the corresponding layer is a layer having a same resolution as the input layer, and the second operation comprises a 1×1 convolution.

14. The apparatus of claim 11, wherein the instructions being operable with the at least one processor to implement the neural network to obtain the output data of the input layer according to the first input data and the second input data are operable with the at least one processor to implement the neural network to:

concatenate the first input data and the second input data to obtain a concatenated input data; and perform at least one convolution on the concatenated input data to obtain the output data of the input layer.

15. The apparatus of claim 14, wherein the at least one convolution is implemented as n successive 3×3 convolutions, wherein n is an integer and n≥1.

16. The apparatus of claim 14, wherein the at least one convolution uses a convolution kernel having a same kernel size as that used in convolutions at the encoding network.

17. The apparatus of claim 11, wherein the instructions being operable with the at least one processor to implement the neural network to obtain the output image according to the decoding output are operable with the at least one processor to implement the neural network to:

acquire an input image inputted at the encoding network; and perform point-to-point addition on the input image and the decoding output to obtain the output image.

* * * * *